United States Patent
Ganong, III

(10) Patent No.: US 8,275,618 B2
(45) Date of Patent: *Sep. 25, 2012

(54) MOBILE DICTATION CORRECTION USER INTERFACE

(75) Inventor: William F. Ganong, III, Brookline, MA (US)

(73) Assignee: Nuance Communications, Inc., Burlington, MA (US)

( * ) Notice: Subject to any disclaimer, the term of this patent is extended or adjusted under 35 U.S.C. 154(b) by 850 days.

This patent is subject to a terminal disclaimer.

(21) Appl. No.: 11/926,938

(22) Filed: Oct. 29, 2007

(65) Prior Publication Data

US 2008/0077406 A1    Mar. 27, 2008

Related U.S. Application Data

(63) Continuation-in-part of application No. 11/316,347, filed on Dec. 22, 2005.

(60) Provisional application No. 60/638,652, filed on Dec. 22, 2004.

(51) Int. Cl.
*G10L 15/00*    (2006.01)
(52) U.S. Cl. ........................................ 704/251; 704/270
(58) Field of Classification Search .................. 704/270, 704/270.1, 275, 251
See application file for complete search history.

(56) References Cited

U.S. PATENT DOCUMENTS

| | | | | |
|---|---|---|---|---|
| 6,249,764 B1 * | 6/2001 | Kamae et al. | ............... | 704/270.1 |
| 6,278,968 B1 * | 8/2001 | Franz et al. | ....................... | 704/3 |
| 6,662,163 B1 * | 12/2003 | Albayrak et al. | ............. | 704/275 |
| 6,868,385 B1 * | 3/2005 | Gerson | ......................... | 704/275 |
| 7,062,444 B2 * | 6/2006 | He et al. | ......................... | 704/275 |
| 7,092,883 B1 * | 8/2006 | Gretter et al. | ................. | 704/242 |
| 7,099,824 B2 * | 8/2006 | Kushida et al. | ............... | 704/231 |
| 7,437,297 B2 * | 10/2008 | Chaar et al. | .................... | 704/275 |
| 2001/0013001 A1 * | 8/2001 | Brown et al. | ............. | 704/270.1 |
| 2001/0056346 A1 * | 12/2001 | Ueyama et al. | ............... | 704/246 |
| 2005/0283364 A1 * | 12/2005 | Longe et al. | .................. | 704/257 |
| 2006/0190256 A1 * | 8/2006 | Stephanick et al. | .......... | 704/252 |

* cited by examiner

*Primary Examiner* — Jialong He
(74) *Attorney, Agent, or Firm* — Sunstein Kann Murphy & Timbers LLP

(57) ABSTRACT

A method of speech recognition is described for use with mobile devices. A portion of an initial speech recognition result is presented on the mobile device including a set of general alternate recognition hypotheses associated with the portion of the speech recognition result. A key input representative of one or more associated letters is received from the user. The user is provided with a set of restricted alternate recognition hypotheses starting with the one or more letters associated with the key input. Then a user selection is accepted of one of the restricted alternate recognition hypotheses to represent a corrected speech recognition result.

21 Claims, 6 Drawing Sheets

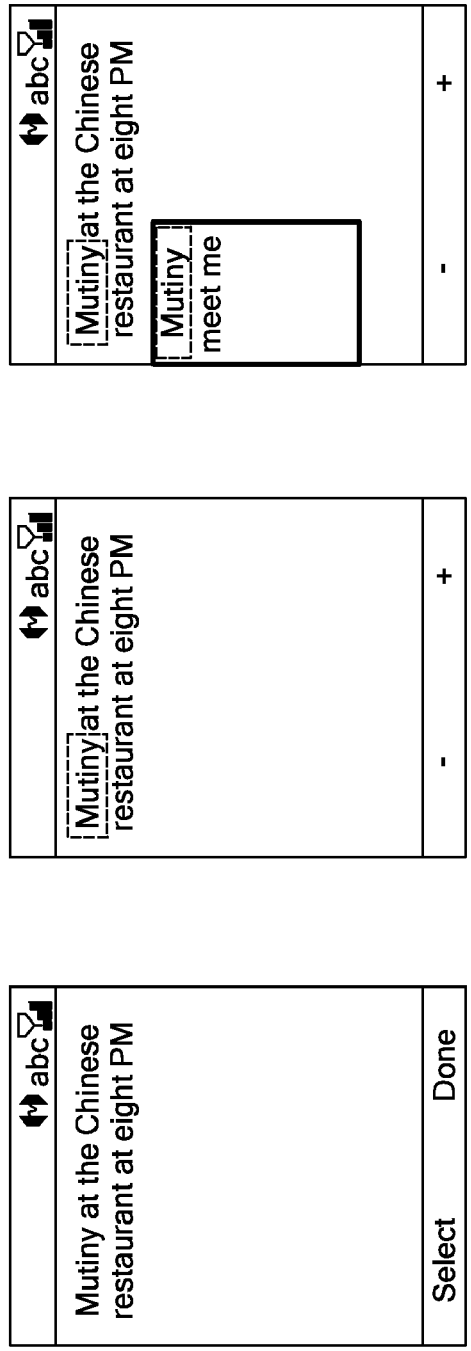
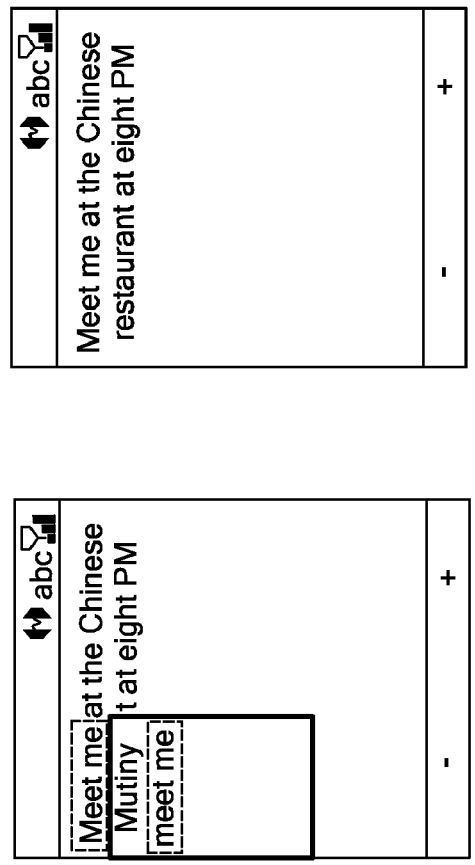

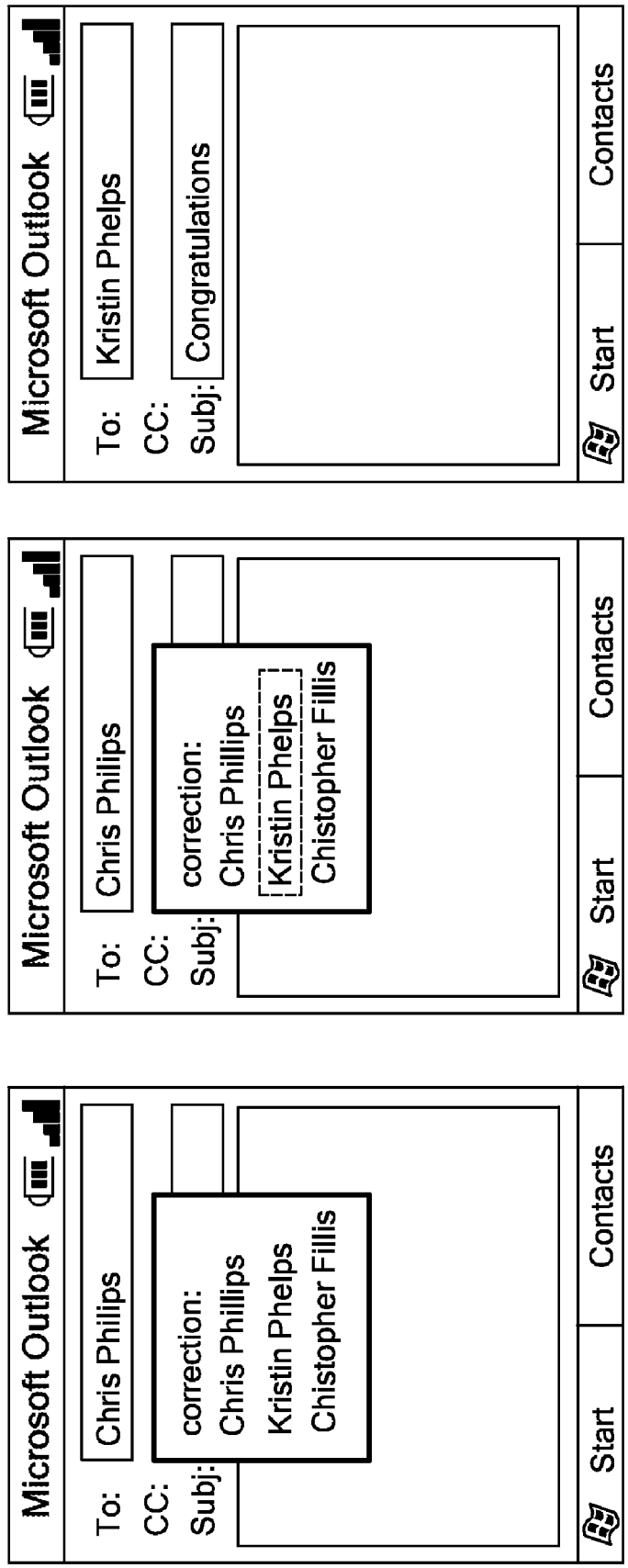

MOBILE DICTATION CORRECTION USER INTERFACE

This application is a continuation-in-part of U.S. patent application Ser. No. 11/316,347, filed Dec. 22, 2005, which in turn claims priority from U.S. Provisional Patent Application 60/638,652, filed Dec. 22, 2004, the contents of which are incorporated herein by reference.

FIELD OF THE INVENTION

The invention generally relates to using speech recognition to create textual documents, and more specifically, to a user correction interface for a mobile device creating such documents.

SUMMARY OF THE INVENTION

Embodiments of the present invention use speech recognition to create textual documents, particularly e-mails and field force automation forms, on a mobile phone (or other mobile device). Generally, input speech is collected from a user and initially recognized. Then, the user is allowed to correct any recognition errors using a correction interface, and the user-approved corrected text is submitted to an associated application. Specifically, a portion of an initial speech recognition result is presented on the mobile device including a set of general alternate recognition hypotheses associated with the portion of the speech recognition result. A key input representative of one or more associated letters is received from the user. The user is provided with a set of restricted alternate recognition hypotheses starting with the one or more letters associated with the key input. Then a user selection is accepted of one of the restricted alternate recognition hypotheses to represent a corrected speech recognition result.

In further specific embodiments, the corrected speech recognition result is provided to a text application. In addition, an original audio file may be provided with the corrected speech recognition result; for example, using a URL pointer to a storage location of the original audio file. In specific embodiments, the initial speech recognition result may include a word lattice containing the general alternate recognition hypotheses, or a recognition sausage containing the general alternate recognition hypotheses. In some embodiments, the recognition hypotheses may be derived via a phone to letter algorithm.

Embodiments of the present invention also include a user interface employing one of the above methods and a mobile user device having a user correction interface according to any of the above.

Embodiments of the invention also include a method of speech recognition on a mobile device in which an audio speech input is received from a user to the mobile device. The audio speech input is processed with automatic speech recognition to produce speech recognition text representative of the audio speech input. And the speech recognition text and the audio input are forwarded to a text application.

Embodiments of the present invention also include a method of speech recognition on a mobile device in which an audio speech input is received from a user of a mobile device. The audio speech input is processed with automatic speech recognition having a recognition vocabulary to produce a set of speech recognition hypotheses corresponding to the audio speech input. At least one of the recognition hypotheses includes a sequence of letters representing a word not present in the recognition vocabulary.

BRIEF DESCRIPTION OF THE DRAWINGS

FIG. 3 shows a sequence of display screens showing a user correction action according to one embodiment of the present invention.

FIG. 4 A-C shows an embodiment which populates fields by detection of keywords.

DETAILED DESCRIPTION OF SPECIFIC EMBODIMENTS

Figure 1:
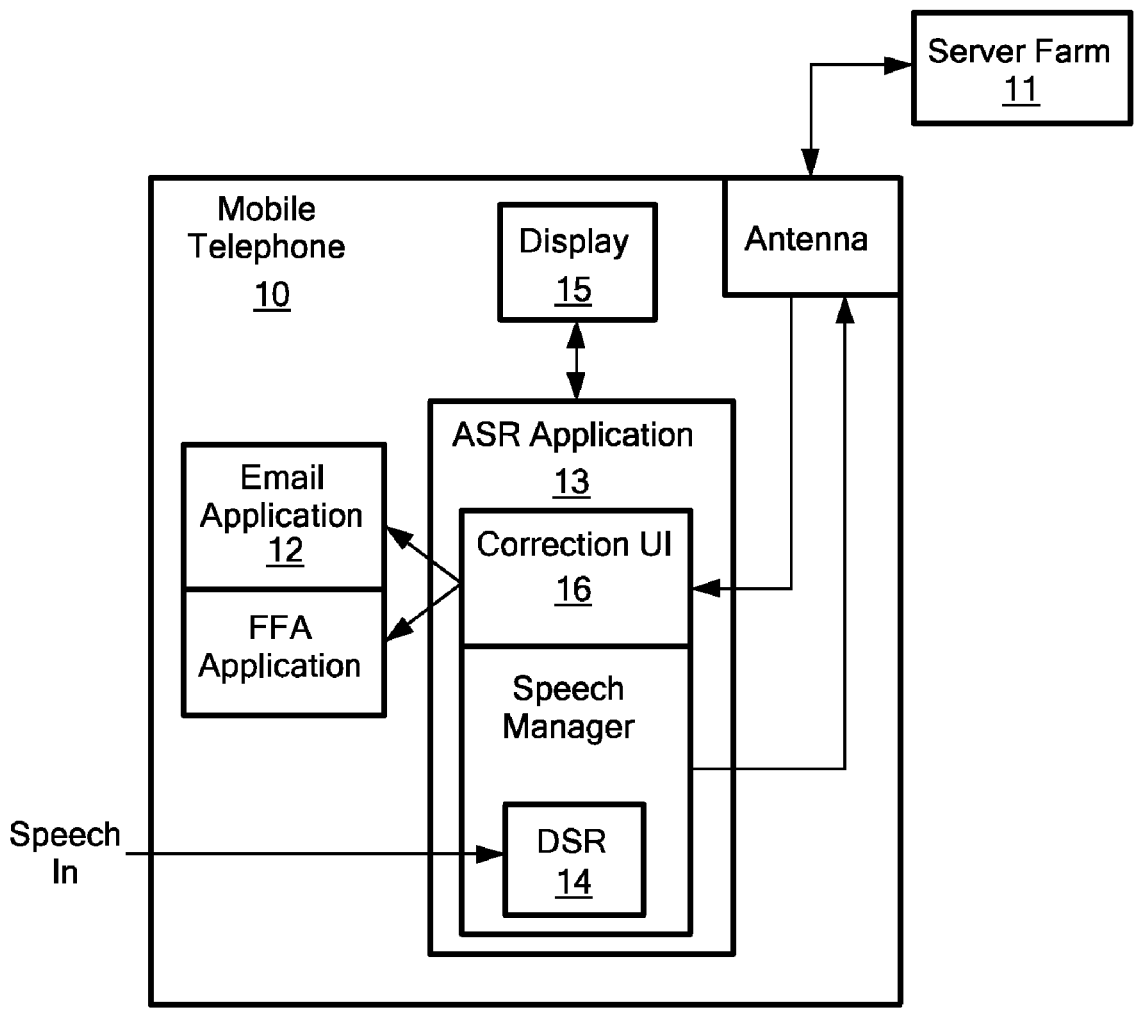
FIG. 1 shows various functional blocks on mobile device client side according to one embodiment of the present invention.

Specific embodiments of a user correction interface for mobile devices take into multiple factors including:
  system design;
  design of the total interaction, including how the user interacts with other applications and ergonomics of the situation;
  the correction user interface (UI);
  speech recognition technology to improve accuracy in this situation, including rapid acoustic adaptation, and language model (LM) adaptation.

In a typical specific application, a user receives an e-mail using the email client on their phone, opens it, and decides to reply. The user dictates a reply which is sent to a remote server. The server computes a "rich-recognition-result" in the form of a word lattice or sausage (first described in L. Mangu, E. Brill and A. Stolcke, *Finding Consensus in Speech Recognition: Word Error Minimization and Other Applications of Confusion Networks*, Computer, Speech and Language, 14(4):373-400 (2000), the contents of which are incorporated herein by reference). This rich recognition result is then sent back to the user's phone. Specific software embodiments provide a correction UI which displays to the user the rich-recognition-result's top choice. This user interface allows the user to quickly navigate between errors and fix them. The correction software uses the rich recognition results to present alternatives for words or phrases. An easy to use process is presented for correcting recognition errors from these alternatives. After correction, the text is available for user to send or edit using whatever editing mechanism the phone already provides.

Embodiments may be based on an architecture in which speech recognition is done on a server, while corrections are performed locally using an interface on the mobile phone. By basing the main speech recognition process on a remote server, much more computational power is available than locally at the phone, thereby providing better recognition accuracy. And the cost of that computational power can be spread among several users. On the other hand, performing correction locally on the phone allows the user can finish a current document immediately instead of depending on perfect recognition or waiting for later correction of the document on a workstation.

A choice of server-side recognition and client-side correction leads to another specific aspect of the system architecture: the server computes and returns not just its top choice for what the user said, but also a "rich recognition result." This rich recognition result includes information about recognition alternatives, i.e., alternative hypotheses about what the user said which didn't score as well as the top choice, but which might be valid alternatives.

One architectural and user-interface aspect of such a system is how the correction software is integrated with the specific application (e.g., email, short messaging service (SMS), or field force automation (FFA) software). Two options are (1) using a light integration with an existing email application, or (2) integrating the correction UI with the email application. This decision affects both how the correction UI software is written and how the system appears to the user.

With integrated applications, the whole user interface is available for development and can be optimized both for correction and for normal use of the application. But there are a couple of drawbacks to this approach. First, writing an integrated application creates responsibility for all the capabilities of the application (e.g., for an email client, this means responsibility for all the features of the email client). Second, users have to learn the custom UI which may be different from the other applications and uses of the phone.

With a "light integration," a separate "correction-mode" is provided for the application's UI. Thus, at any time the user is using either the application and its interface (essentially unaltered) or the correction interface with whatever specific correction UI has been provided. An example of a "light integration" is described below.

Another architectural consideration is how the speech is transmitted from the phone to the server. Of course, the normal speech channel may be used, but the normal speech encoding on a mobile phone uses a lower bandwidth and more compression than is optimal for speech recognition. Thus some embodiments may send a higher fidelity representation of the speech to the server over the data channel. There are at least two ways to accomplish that: (1) create, compress and send speech data files; or (2) use Distributed Speech Recognition (DSR) technology to "stream" analyzed frames of speech data to the server (see, e.g., *ETSI Standard ES* 202 211 *Distributed Speech Recognition; Extended Front-end Feature Extraction Algorithm; Compression Algorithm, Back-end Speech Reconstruction Algorithm*, November 2003, incorporated herein by reference).

Figure 2:
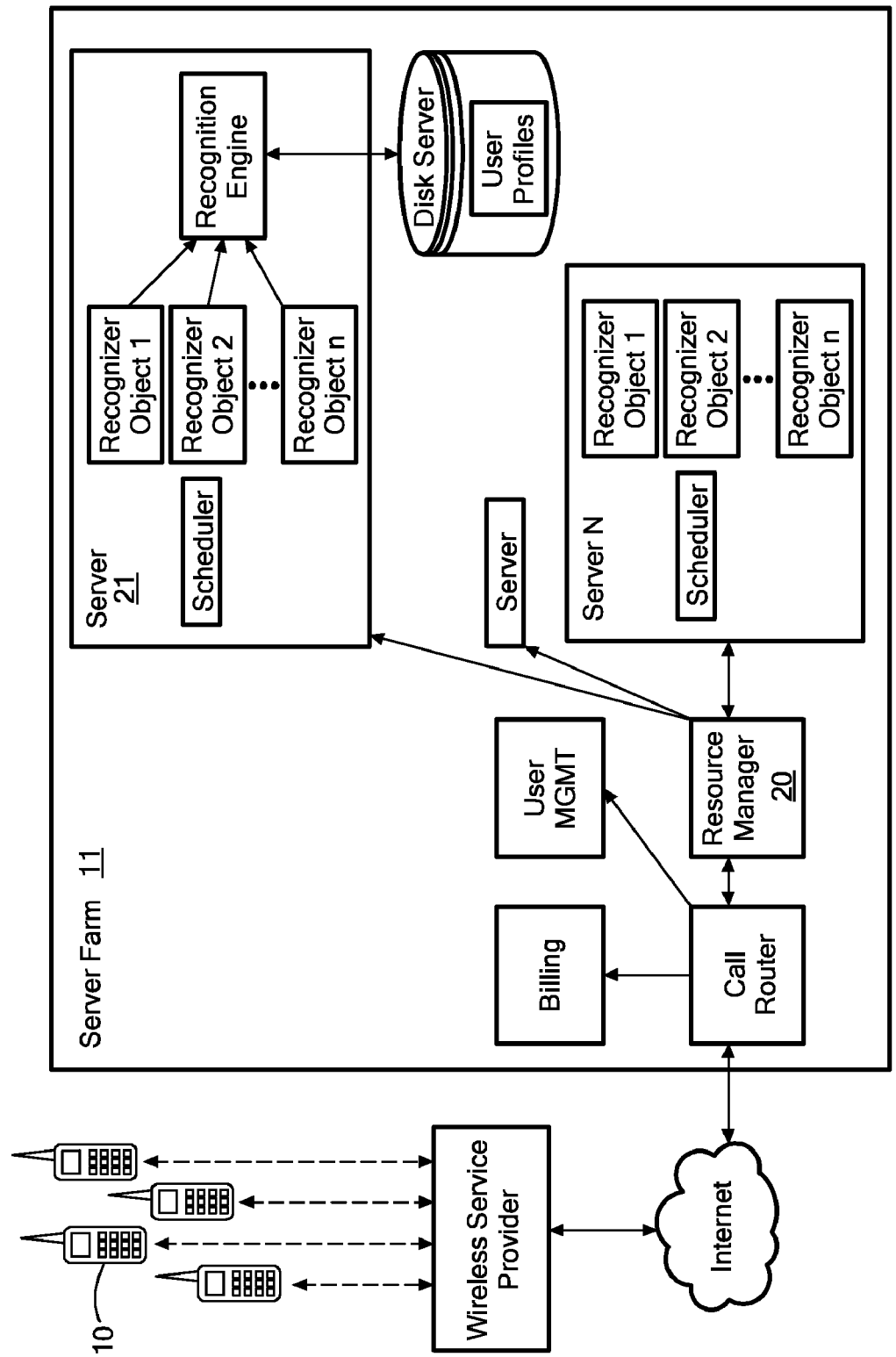
FIG. 2 shows various functional blocks for a server system to support a network of devices according to FIG. 1.
Figure 5C:
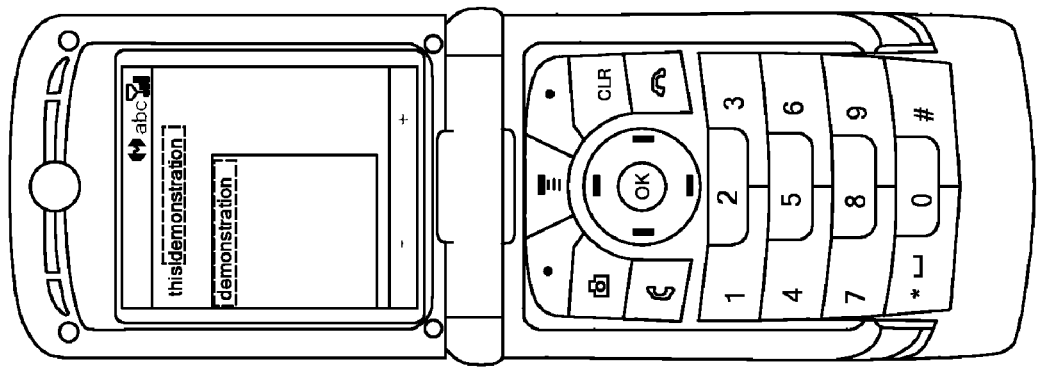
FIG. 5 A-F shows an embodiment which presents subsets of alternate recognition hypotheses based on user key press inputs.
Figure 5B:
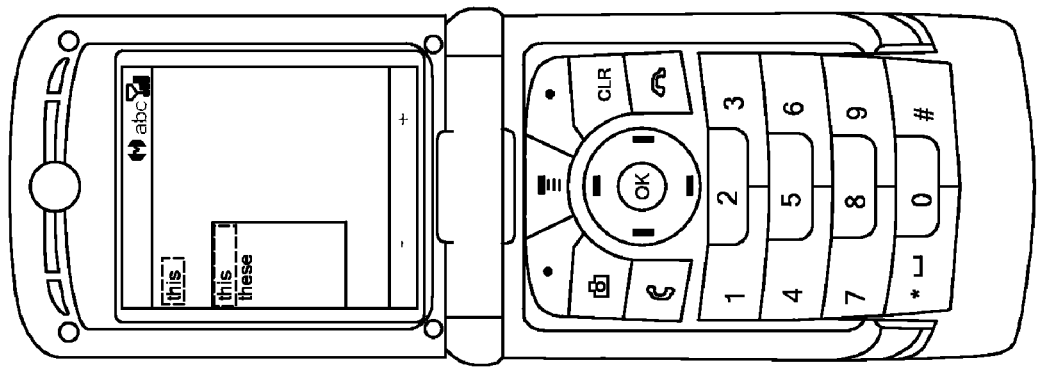
Figure 5A:
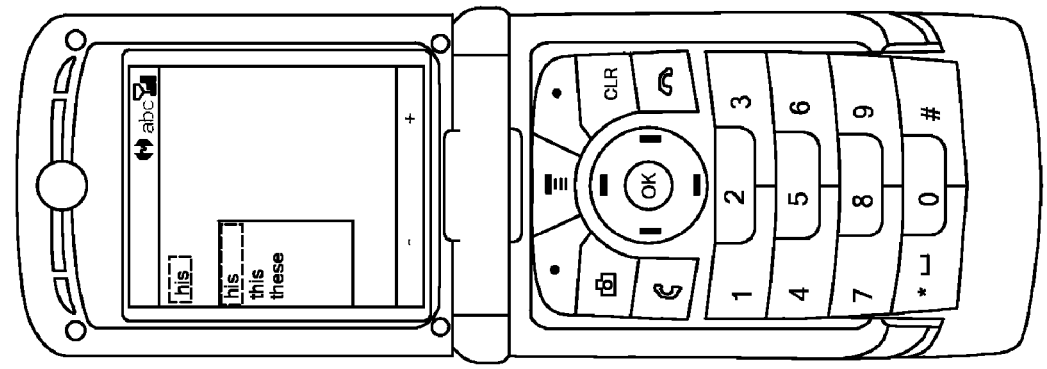
Figure 5F:
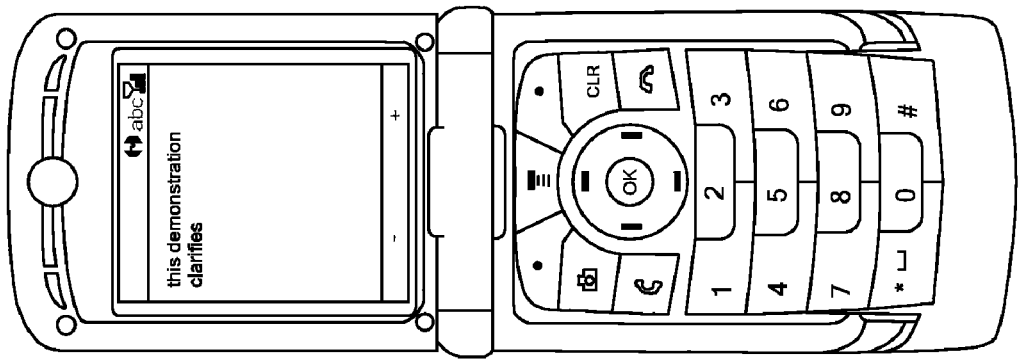
Figure 5E:
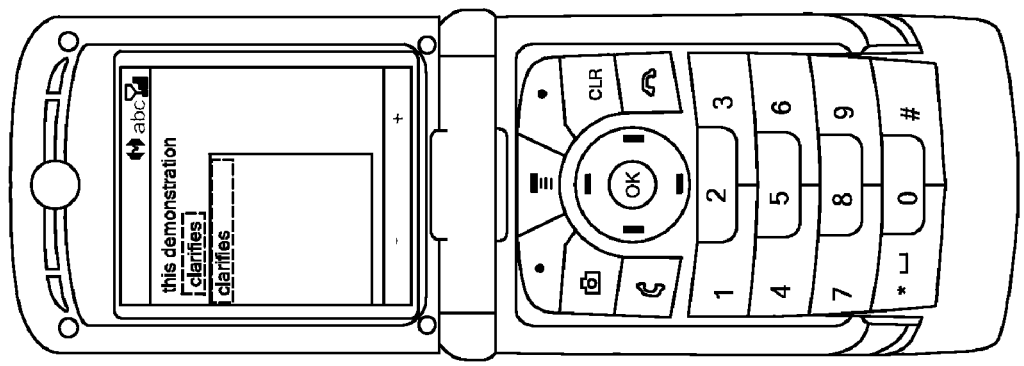
Figure 5D:
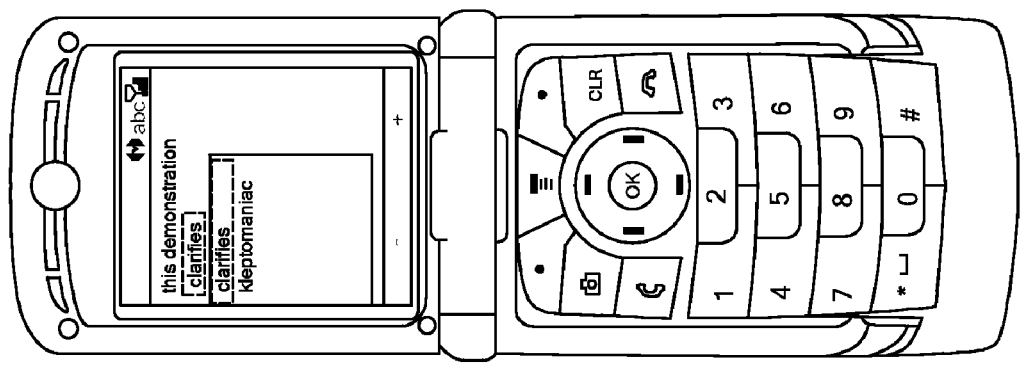

FIG. 1 shows various functional blocks on mobile device client side according to one embodiment of the present invention. FIG. 2 shows various functional blocks for a server system to support a network of devices according to FIG. 1. Multiple user devices such as wireless phone 10 communicate with a central server farm 11 via one or more communications networks such as a wireless provider and/or the Internet. The server farm 11 includes multiple processing stages that perform various functions such as billing, user management, and call routing, as well as a resource manager 20 that communicates with one or more speech recognition servers 21. Within the wireless phone are various document processing applications 12 in communication with an automatic speech recognition application 13 that accepts a speech input from a user. The speech input is converted by a Distributed Speech Recognition (DSR) process 14 into DSR frames that are transmitted to the server farm 11 for recognition into representative "rich recognition result" text by the one or more servers 21. The recognition results are returned back to the wireless phone 10 and conveyed to the user via display 15. A correction user interface 16 allows the user to correct any misrecognized words or phrases in the recognition results and the corrected text is then supplied to one or more of the various document processing applications 12.

In some applications, the most frequent mode for using automatic dictation (speech recognition) involves speaking and correcting fairly long pieces of text: sentences and utterances. The user is generally preferred to hold the device headset near to his or her mouth while speaking (and discouraged holding it in front with two hands). The user may also be required to push a key to start and/or end dictation, or a button may have to pushed and held for the entire dictation input.

In addition to a document (e.g., email) including transcribed and correct text, a specific system may also allow the recipient of the document to receive a version of the original audio. Such audio information may be retrieved using a URL which points back to the server and the particular message in question. Such an arrangement would allow a recipient to listen to the original message. Although the audio could be attached directly as a part of the transmitted document (e.g., as a .wav file); but sending a URL may be preferred for a couple of reasons: (1) the resulting audio file would often be relatively large (and therefore a burden to the recipient); and (2) constructing that audio file may be a substantial computational task, if the speech is recorded as DSR frames.

Another workflow consideration is speaker adaptation including both acoustic and language model adaptation. Acoustic recognition is substantially better if acoustic models are trained for a particular user, as is described, for example, in Gales, M. J. F., *Maximum Likelihood Linear Transformations for HMM-based Speech Recognition*, Computer Speech & Language, Vol. 12, pp. 75-98 (1988), the contents of which are incorporated herein by reference. But the user may not want to suffer through a long enrollment procedure in order to use the product. One compromise solution is to online unsupervised adaptation to create acoustic models for each user. Thus, the resulting server-side software would be speaker dependent (and may likely use caller-ID to identify speakers).

The performance of the speech recognizer can also be significantly improved by training the language model on other documents generated by the same user, as is described, for example, in Kneser, et. al., *On The Dynamic Adaptation of Stochastic Language Models*, Proc. ICASSP 1993, the contents of which are incorporated herein by reference. Recognition performance on "reply" emails may also be improved by using the original email to train or select among language models. And it may also be useful to add names from the user's contact list to the recognition vocabulary.

A typical modern mobile phone has a small, colorful display and a small keypad containing about 15 keys, often one or more cursor navigation keys, and the ability to connect to the internet and run applications. Many of these phones also come with a T9 or ITAP interface which allows users to enter words by typing on a small keypad. These interfaces map each of the number keys from zero to nine to several different letters. These systems also support one key per letter typing, by filtering the key sequence against a dictionary. Embodiments of the present invention need to use such a small keypad and small display to correct errors efficiently.

Thus, one specific embodiment of a correction interface works as follows. The best scoring speech recognition hypothesis from the rich recognition result is displayed in a text buffer, which may take up most of the device's screen and which the user can navigate. There also is a correction mode and an alternatives window which displays, for some selected text, alternatives which the user might want to substitute for the selected text. (The alternatives window is shown exactly when the UI is in correction mode). The user navigates through the text-buffer, either in native mode, i.e. using whatever techniques are supplied with the application, or when in the correction mode, changing the selected text to correct. The user corrects text by (1) selecting alternatives from the alternatives window (in a number of ways, to be described below), (2) dropping out of the correction mode, and using the native text input methods, and/or (3) respeaking. When the user is satisfied with the text, they "drop down" to the application, and use the application to send the email, or otherwise deal with the text.

An embodiment may extend the application's UI so as to take over one soft-key to make it a "select" command. When the user presses the "select" soft-key in the native application, the correction interface embodiment enters the correction mode and displays an alternatives window. Once within the correction-mode, the behavior of more of the device keys may be changed. In one particular embodiment, the keys are used as follows:

Left-soft key: "−" decreases the size of the selected text by one word. If this makes the selected text have no words, then leave correction mode.

Right-soft key: "+" increases the size of the correction window by one word (adding it to the right of the selection).

Down-arrow: moves the highlighting in the alternatives window down 1.

Up-arrow: moves the highlighting in the alternatives window up 1.

Thumbwheel: moves the highlighting with the alternatives window.

Digit (letter) keys: selects alternatives which are consistent with the letters named on the keys (as in the T9 interface technique).

Left-arrow: moves the alternatives window one word left (keeping the same size—i.e., if the alternatives window was 3 words long, move to add the word to the left and drop the rightmost selected word.

Right-arrow: moves the alternatives window right.

For each of these ways of choosing among the alternative hypotheses, whenever the alternative selection is changed, it is immediately inserted into the text buffer. If the user moves the alternatives window to the end of the buffer, and past the end buffer (on the right or the left), the correction mode is exited back into the application mode.

In typical embodiments, the normal command flow is for the user to navigate to an error, press select (which selects one word), increase the size of the selection until the entire incorrect phrase is selected, and move among the proposed alternatives using the up and down arrow keys (or thumbwheel, or digit keys). The user will move among various errors, fixing them. They can either move the alternatives box using the left or right keys, or they can return to normal mode by shrinking the window using the "−" key to zero word length. Then they can navigate using the normal mode keys (in particular the up and down arrow keys) to other errors, and fix them. After the user is done correcting, the user will return to the native application mode, and shrink the alternatives window, via the "−" key, down to zero words.

The alternatives window typically will be a little pop-up box near the selected text that does not obscure the line the selected text is on. When the selected text is in the top half of the screen, the popup window drops down, and vice versa.

The alternatives window typically displays a number of different kinds of text which the user might want to substitute for the top choice text, including:

Confusable words (words which the recognizer computes as likely substitutions) including multiple words, Alternative capitalizations: if the word might be a proper noun, it will usually be offered in a capitalized form (unless it's capitalized already, in which case it will be offered in an uncapitalized form), Alternative rewritings: if the words are numbers, abbreviations or other words which dictation software often rewrites, it may be offered as alternative rewritings, Alternative punctuation: when the user pronounces punctuation, the name of the punctuation may be placed in the alternatives list as well, and Phonetic spelling: each selection may also be offered as a phonetics-based guess about what the spelling of the word might be.

There are a number of ways to compute the alternatives list presented in the alternatives window:

Sausages where words in the recognition results are bundled together as groups of recognition alternatives.

Extended Sausages for multiword alternatives. Sausages have one word per link, but this technology can be extended so that, if multiple words are selected, multiple word hypotheses which cover the same speech are displayed.

Instantaneous Correction Algorithm bundles words together using processing on NBest text strings. An example of C++ code for such an algorithm is included herein as Appendix I.

P2T Technology in which the input speech is recognized as a sequence of phones which are then translated to letters. Or the input speech may be directly recognized as a sequence of letters in order to generate plausible spellings for out-of-vocabulary words, particularly names. (In general, P2T technology may not be highly accurate, but it may succeed in creating words which "sound like" the input, which may be better than typical recognition errors.)

In the specific case of P2T technology, two additional knowledge sources can be applied: (1) a very large dictionary, and (2) a large name list (e.g., from a directory). Thus, as many as three alternatives can be added based on P2T technology: one that depends only on the present phones, one that is the best word in a large dictionary, and one that is the best name available to a phone directory service.

There can be several ways to choose among alternatives in the alternatives window.

Up/down arrow-keys: The up and down arrow keys can be used to move the selection in the alternatives window.

Thumbwheel: For devices that have a thumbwheel, that can be used like the up-down arrow keys.

Ambiguous key choices: Users may be able to choose among alternatives by typing digit keys that correspond to letters in the alternatives. For example, if the alternatives include "clark" and "klerk," and the user presses the digit 2 key (which is labeled abc), clark is selected. If the user presses 5 (labeled jkl) "klerk" will be selected. Also, this "typing" will also go through multiple keys, so "clark" could be differentiated from "clerk" by typing 252 or 253.

Alternative embodiments can support user inputs from a stylus such as is common in PDA-type portable devices. Such devices also commonly use handwriting recognition technology in conjunction with the stylus. In such a mobile device, a user correction interface for speech recognition can support a stylus-based input. In such an embodiment, the stylus can be used to select words for correction, to choose among N-best list entries, and/or use handwriting as an alternate text input (similar to the T9 or iTap technology for key-based inputs).

FIG. 3 shows a sequence of display screens showing a user correction action according to one embodiment of the present invention. For this specific example, assume that the correction interface can use four arrow keys for navigating up, down, left and right; an extend selection key; and an accept selection key. In this example, the user said, "Meet me at the Chinese Restaurant at eight PM." FIG. 3(a) shows the initial recognition result displayed to the user "mutiny at the Chinese restaurant at eight PM" with the cursor after the first word "mutiny." In FIG. 3(b), the user extends the selection highlight bar to the left with the select key, and in response in FIG. 3(c), the system shows alternatives from the rich recognition results object. In FIG. 3(d), the user scrolls down in the alternatives window using the down-arrow key to highlight the alternative "meet me." In FIG. 3(e), the user pushes the accept key and "mutiny" is replaced by "meet me," with the last word of the replaced text becoming the new selection.

FIG. 5 A-F shows an embodiment which presents subsets of alternate recognition hypotheses based on user key press inputs as mentioned above, referred to herein as the S9 interface, which is somewhat like the T9 predictive text algorithm. The T9 predictive text entry allows entry of text on a phone keypad based on the telephone keypad mapping between letters and numbers. Although each key is assigned to multiple letters, to enter a word, the user just presses one key for each letter and lets the system disambiguate the results. So to enter the word "good," the user would press 4 6 6 3. The system then decides which of the 34 possible letter sequences consistent with these keys is the most probable word.

So FIG. 5 A-F shows one example of a scenario using the S9 approach in an embodiment based on isolated word recognition where the user pauses and verifies each spoken word before proceeding to the next word. In FIG. 5A, the user has spoken the first word, which the system interprets the word "his" as being the current candidate with the highest probability, and an alts listing of "his," "this," and "these" provided to show the most likely recognition hypotheses for the spoken input. The user then presses the $8_{TUV}$ key, which the system interprets to limit the results to those starting with the letter "t," so that in FIG. 5B, the current candidate becomes "this" with the alts list now limited to alts starting with "t": "this" and "these." The user then accepts "this" as the correct input and speaks the next work, which the as shown in FIG. 5C the systems provides "demonstration" as the current candidate with no other alts. The user accepts "demonstration" and speaks the third word, which the system returns "clarifies" as the current candidate, with an alts list of "clarifies" and "kleptomaniac" as shown in FIG. 5D. The user then presses the $2_{ABC}$ key, which limits the alts to those starting with "c," just "clarifies" (shown in FIG. 5E), which the user accepts as shown in FIG. 5F.

Another similar S9 embodiment may be based on continuous speech recognition where the user speaks a multi-word input phrase without stopping between words. For example, the phrase from FIG. 5 could be spoken in a natural manner as "This demonstration clarifies . . . " without pausing between words. By speaking in continuous multi-word input phrases, the S9 approach can then be used to correct misrecognized words (e.g., "his") in the recognition results.

FIG. 4 shows an embodiment which populates fields by detection of keywords where a specific email application is chosen, but no particular window within that application. This embodiment parses the speech input recognition results for certain keywords, which if seen, cause all or a portion of the subsequent text to be placed in an appropriate field. For the example depicted in FIG. 4, the user says: "To: Kristen Phelps, Subject: Congratulations", which the system uses to populate the "To:" and "Subject:" fields in a blank email message. FIG. 4(a) shows that the initial text inserted into the To: field is "Chris Phillips," but the alternatives list as shown in FIG. 4(b) has the correct name as the second choice. The user simply uses the down arrow to scroll down two positions on the alternatives list and select "Kristen Phelps" with the select key to produce the correct text entries for the To: and Subject: fields of the message as shown in FIG. 4(c). The message field in the email message shown is produced as described above with respect to text entry and correction, such as for FIG. 3.

Further such embodiments could also be useful for the general form filling task such as for FFA applications, where a form with named fields and the user simply dictates by field name. For example, "from city Boston, to city New York, date, Dec. 25, 2004," etc. Robust parsing can be applied and used to fill in the appropriate fields. With such an arrangement, the user may be able to fill in all or parts of a given form, and/or may be able to fill in the fields in any order.

In such an application, if the user has not yet clicked on a field text box (e.g., to:, cc:, bcc, subject, body, etc.) the input may be recognized with a large vocabulary. Within that vocabulary, keywords are defined (again, to:, cc:, bcc:, subject, body, etc.) and if a line starts with a keyword, the subsequent utterance up to the next keyword is put into the corresponding field. This is repeated until the end of the line. If a line doesn't start with a keyword, then, a parsing algorithm may place the line in the to: field if it starts with a name from the user's contact list, and otherwise, the line may be put the subject field. This "open field" mode can continue until the "body" field is reached (either by saying the keyword "body," or by clicking in the body field). Once in the "body" text field, such robust keyword parsing may be turned off.

Embodiments are not limited to the specific application of email. For example, similar arrangements can be used for applications such as SMS and FFA. Clearly there are many other applications in which such a correction interface would be useful; for example, applications involving free form text entry for things like internet search, or filling any text box within a form—like on an internet page.

Another such application would be to enter text for a search engine such as Google™. After the initial recognition result is returned, the initial text string can be used by the search engine as the search string. Then, while the search is being performed, the user may be allowed to correct the query string. If we get the search results return before the corrections are made, an insert on the search page may show the results. Once the corrections are completed, the corrected search string can be sent out to perform the search.

Nor are embodiments limited to the specific device example of a mobile phone, there are clearly many other devices on which such a speech recognition correction interface would be useful. Another example would be a remote control for a television which provides for dictation of email and other documents using an internet-connected television. In such an application, the button constraints on the television remote control would be similar to the example described of a mobile phone.

Embodiments of the invention may be implemented in any conventional computer programming language. For example, preferred embodiments may be implemented in a procedural programming language (e.g., "C") or an object oriented programming language (e.g., "C++"). Alternative embodiments of the invention may be implemented as pre-programmed hardware elements, other related components, or as a combination of hardware and software components.

Embodiments can be implemented as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a mobile device (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

Although various exemplary embodiments of the invention have been disclosed, it should be apparent to those skilled in the art that various changes and modifications can be made which will achieve some of the advantages of the invention without departing from the true scope of the invention.

APPENDIX I

Instantaneous Correction Algorithm.

```
int findFirstDifference( LPCTSTR pszString1, int nStartAt1,
                         LPCTSTR pszString2, int nStartAt2,
                         BOOL bStopAtEndOfWord,
                         int* pnSpaceBeforeDifference1,
                         int* pnSpaceBeforeDifference2 )
{
    *pnSpaceBeforeDifference1 = -1;
    *pnSpaceBeforeDifference2 = -1;
    // Find first difference between the strings
    BOOL bDone = FALSE;
    for ( int i = nStartAt1, j = nStartAt2; !bDone; i++, j++ )
    {
        if ( pszString1[ i ] != pszString2[ j ] )
        {
            bDone = TRUE;
        }
        else if ( pszString1[ i ] == _T('\0') )
        {
            *pnSpaceBeforeDifference1 = -1; // no differences
            *pnSpaceBeforeDifference2 = -1; // no differences
            i = -1;
            j = -1;
            bDone = TRUE;
        }
        else if ( pszString1[ i ] == _T(' ') )
        {
            *pnSpaceBeforeDifference1 = i;
            *pnSpaceBeforeDifference2 = j;
            if ( bStopAtEndOfWord )
            {
                i = -1;
                j = -1;
                bDone = TRUE;
            }
        }
    }
    return i-1;
}
int findNextWordBoundary( LPCTSTR pszString, int nStartAt, BOOL& bEOL )
{
    // Find the end of the above words by going until we reach spaces
    int nSpaceEnd = -1;
    int i = nStartAt;
    while ( nSpaceEnd == -1 )
    {
        if ( pszString[ i ] = _T(' ') )
        {
            nSpaceEnd = i;
            bEOL = FALSE;
        }
        else if ( pszString[ i ] = _T('\0') )
        {
            nSpaceEnd = i;
            bEOL = TRUE;
        }
        else
        {
```

APPENDIX I-continued

Instantaneous Correction Algorithm.

```
                    i++;
                }
            }
            return i;
}
int findEndOfString( LPCTSTR pszString, int nStartAt )
{
    int i = nStartAt;
    while ( pszString[ i ] != _T('\0') )
    {
        i++;
    }
    return i;
}
DWORD getDifferences( LPCTSTR pszString1, LPCTSTR pszString2, int* pnDiffBoundary1, int*
pnDiffBoundary2 )
{
#define DISPLAY_RESULTS
    LONGLONG pc1;
    LONGLONG pc2;
    QueryPerformanceCounter( (LARGE_INTEGER*)&pc1 );
#ifdef DISPLAY RESULTS
    printf( "\n--------------\n" );
    printf( "\nComparing...\n" );
    printf( "   %s\n", pszString1 );
    printf( "   %s\n", pszString2 );
    printf( "\n" );
    printf( "Results...\n" );
#endif // DISPLAY_RESULTS
    int nWordBoundary1[ 10 ];
    int nWordBoundary2[ 10 ];
    pnDiffBoundary1[ 0 ] = -2;
    pnDiffBoundary2[ 0 ] = -2;
    int nDiffBegin;
    BOOL bDone = FALSE;
    for ( int nDiff = 1; !bDone; nDiff += 2 )
    {
        nDiffBegin = findFirstDifference(
            pszString1, pnDiffBoundary1[ nDiff - 1 ] + 2,
            pszString2, pnDiffBoundary2[ nDiff - 1 ] + 2,
            FALSE,
            &nWordBoundary1[ nDiff ],
            &nWordBoundary2[ nDiff ] );
        pnDiffBoundary1[ nDiff ] = nWordBoundary1[ nDiff ] + 1;
        pnDiffBoundary2[ nDiff ] = nWordBoundary2[ nDiff ] + 1;
        if (nDiffBegin == -1 )
        {
            if ( nDiff == 1 )
            {
                printf( "No difference found.\n" );
            }
            bDone = TRUE;
            continue;
        }
        BOOL bResolvedDiff = FALSE;
        int nSearchDistance = 1;
        int nMaxSearchDistance = 5;
#ifdef DISPLAY_RESULTS
        TCHAR szWord1[ 512 ];
        TCHAR szWord2[ 512 ];
#endif // DISPLAY_RESULTS
        while ( !bResolvedDiff && nSearchDistance <= nMaxSearchDistance )
        {
            BOOL bEOL1;
            nWordBoundary1[ nDiff+nSearchDistance ] = findNextWordBoundary(
pszString1, nWordBoundary1[ nDiff+nSearchDistance-1 ] + 1, bEOL1 );
            BOOL bEOL2;
            nWordBoundary2      [ nDiff+nSearchDistance ] =
findNextWordBoundary( pszString2, nWordBoundary2[ nDiff+nSearchDistance-1 ] + 1, bEOL2 );
            // Check next word in both strings (replacement)
            int nBogus;
            for ( int i = 0; i <= nSearchDistance; i++ )
            {
                // Check for insertion
                nDiffBegin = findFirstDifference( pszString1, nWordBoundary1[
nDiff + i ] + 1, pszString2, nWordBoundary2[ nDiff + nSearchDistance ] + 1, TRUE, &nBogus,
&nBogus );
                if ( nDiffBegin == -1 ) // no difference
```

APPENDIX I-continued

| Instantaneous Correction Algorithm. |
|---|

```
                {
#ifdef DISPLAY_RESULTS
                    if ( i > 0 )
                    {
                        _tcsncpy( szWord1, pszString1 +
nWordBoundary1[ nDiff ] + 1, nWordBoundary1[ nDiff + i ] – nWordBoundary1[ nDiff ] – 1 );
                        szWord1[ nWordBoundary1[ nDiff+i ] –
nWordBoundary1[ nDiff ] – 1 ] = _T('\0');
                    }
                    _tcsncpy( szWord2, pszString2 + nWordBoundary2[ nDiff
] + 1, nWordBoundary2[ nDiff + nSearchDistance ] – nWordBoundary2[ nDiff ] – 1 );
                    szWord2[ nWordBoundary2[ nDiff+nSearchDistance ] –
nWordBoundary2[ nDiff ] – 1 ] = _T('\0');
                    if ( i == 0 )
                    {
                        printf ( "    Text \"%s\" was inserted\n",
szWord2 );
                    }
                    else
                    {
                        printf( "    Text \"%s\" was replaced with
\"%s\"\n", szWord1, szWord2 );
                    }
#endif // DISPLAY_RESULTS
                    pnDiffBoundary1[ nDiff + 1 ] = nWordBoundary1[ nDiff
+ i ] – 1;
                    pnDiffBoundary2[ nDiff + 1 ] = nWordBoundary2[ nDiff
+ nSearchDistance ] – 1;
                    bResolvedDiff = TRUE;
                    continue;
                }
            }
            if ( !bResolvedDiff )
            {
                for ( int i = 0; i < nSearchDistance; i++ )
                {
                    // Check for deletion
                    nDiffBegin = findFirstDifference( pszString1,
nWordBoundary1[ nDiff + nSearchDistance ] + 1, pszString2, nWordBoundary2[ nDiff + i ] + 1,
TRUE, &nBogus, &nBogus);
                    if ( nDiffBegin == –1 ) // no difference
                    {
#ifdef DISPLAY_RESULTS
                        _tcsncpy( szWord1, pszString1 +
nWordBoundary1[ nDiff ] + 1, nWordBoundary1[ nDiff + nSearchDistance ] – nWordBoundary1[
nDiff ] – 1 );
                        szWord1[ nWordBoundary1[ nDiff+nSearchDistance
] – nWordBoundary1[ nDiff ] – 1 ] = _T('\0');
                        if ( i > 0 )
                        {
                            _tcsncpy( szWord2, pszString2 +
nWordBoundary2[ nDiff ] + 1, nWordBoundary2[ nDiff + i ] – nWordBoundary2[ nDiff ] – 1 );
                            szWord2[ nWordBoundary2[ nDiff+i ] –
nWordBoundary2[ nDiff ] – 1 ] = _T('\0');
                        }
                        if ( i == 0 )
                        {
                            printf( "    Text \"%s\" was
deleted\n", szWord1 );
                        }
                        else
                        {
                            printf( "    Text \"%s\" was replaced
with \"%s\"\n", szWord1, szWord2 );
                        }
#endif // DISPLAY_RESULTS
                        pnDiffBoundary1[ nDiff + 1 ] = nWordBoundary1[
nDiff + nSearchDistance ] – 1;
                        pnDiffBoundary2[ nDiff + 1 ] = nWordBoundary2[
nDiff + i ] – 1;
                        bResolvedDiff = TRUE;
                        continue;
                    }
                }
            }
            if ( bEOL1 && !bResolvedDiff )
            {
                pnDiffBoundary1[ nDiff + 1 ] = nWordBoundary1[ nDiff +
```

APPENDIX I-continued

Instantaneous Correction Algorithm.

```
nSearchDistance ] – 1;
                pnDiffBoundary2[ nDiff + 1 ] = findEndOfString( pszString2,
nWordBoundary2[ nDiff+nSearchDistance−1 ] + 1 ) − 1;
                bResolvedDiff = TRUE;
                bDone = TRUE;
                nDiff += 2;
                continue;
            }
            if ( bEOL2 && !bResolvedDiff )
            {
                pnDiffBoundary1[ nDiff + 1 ] = findEndOfString( pszString1,
nWordBoundary1[ nDiff+nSearchDistance ] + 1 ) − 1;
                pnDiffBoundary2[ nDiff + 1 ] = nWordBoundary2[ nDiff +
nSearchDistance ] − 1;
                bResolvedDiff = TRUE;
                bDone = TRUE;
                nDiff += 2;
                continue;
            }
            nSearchDistance++;
        } // while ( !bResolvedDiff && nSearchDistance <= nMaxSearchDistance )
        if ( !bResolvedDiff )
        {
#ifdef DISPLAY_RESULTS
            printf( "   *** WARNING: Could not determine difference\n" );
#endif // DISPLAY_RESULTS
            bDone = TRUE;
        }
    }
    QueryPerformanceCounter( (LARGE_INTEGER*)&pc2 );
    printf( "Elapsed time was %d units\n", pc2 − pc1 );
    return ( nDiff − 3 ) / 2;
}
#endif // FIND_STRING_DIFFERENCES
```

What is claimed is:

1. A method of speech recognition on a mobile device comprising:
   presenting with the mobile device for a speech input containing a plurality of spoken words, a recognized word display representing one or more most likely recognition hypotheses corresponding to a current one of the spoken words;
   performing a recognition verification process wherein recognition of each spoken word is veified by a user input action. the verification process including either:
   receiving from the user a key input verifying one of the displayed recognition hypotheses as correct, or
   receiving from the user:
      i. a first key input representative of one or more associated letters which limits the recognition hypotheses presented in the recognized word display to a limited set of one or more recognition hypotheses starting with the one or more letters associated with the key input, and
      ii. accepting a second key input verifying one of the recognition hypotheses presented in the recognized word display as a corrected speech recognition result; and
   repeating the recognition verification process for a next word in the speech input until all the spoken words have been processed.

2. The method according to claim 1, further comprising: providing the verified speech recognition results to a text application.

3. The method according to claim 2, further comprising: providing an currently amended audio file with the verified speech recognition results.

4. The method according to claim 3, wherein the currently amended audio file is provided using a URL pointer to a storage location of the currently amended audio file.

5. The method according to claim 1, wherein a word lattice contains the most likely recognition hypotheses.

6. The method according to claim 1, wherein a recognition sausage contains the most likely recognition hypotheses.

7. The method according to claim 1, wherein the recognition hypotheses are derived via a phone to letter algorithm.

8. A speech recognition user correction interface for a mobile device comprising:
   presenting means for presenting with the mobile device for a speech input containing a plurality of spoken words, a recognized word display representing one or more most likely recognition hypotheses corresponding to a current one of the spoken words;
   recognition verification process means for performing a recognition verification process wherein recognition of each spoken word is verified by a user input action, the verification process including either:
   receiving from the user a key input verifying one of the displayed recognition hypotheses as correct, or
   receiving from the user:
      i. a first key input representative of one or more associated letters which limits the recognition hypotheses presented in the recognized word display to a limited set of one or more recognition hypotheses starting with the one or more letters associated with the key input, and
      ii. a second key input verifying one of the recognition hypotheses presented in the recognized word display as a corrected speech recognition result; and
   repeating means for repeating the recognition verification process means for a next word in the speech input until all the spoken words have been processed.

9. The interface according to claim 8, further comprising:
result means for providing the verified speech recognition results to a text application.

10. The interface according to claim 9, further comprising:
audio means for providing an currently amended audio file with the verified speech recognition results.

11. The interface according to claim 10, wherein the audio means provides the currently amended audio file using a URL pointer to a storage location of the currently amended audio file.

12. The interface according to claim 8, wherein a word lattice contains the most likely recognition hypotheses.

13. The interface according to claim 8, wherein a recognition sausage contains the most likely recognition hypotheses.

14. The interface according to claim 8, wherein the recognition hypotheses are derived via a phone to letter algorithm.

15. A mobile user device comprising:
a user verification interface including:
presenting means for presenting with the mobile device for a speech input containing a plurality of spoken words, a word display representing one or more most likely recognition hypotheses corresponding to a current one of the spoken words;
recognition verification process means for performing a recognition verification process wherein recognition of each spoken word is verified by a user input action. the verification process including either:
receiving from the user a key input verifying one of the displayed recognition hypotheses as correct, or
receiving from the user:
a first key input representative of one or more associated letters which limits the recognition hypotheses presented in the recognized word display to a limited set of one or more recognition hypotheses starting with the one or more letters associated with the key input;
ii. a second key input verifying one of the recognition hypotheses presented in the recognized word display as a corrected speech recognition result; and
repeating means for repeating the recognition verification process means for a next word in the speech input until all the spoken words have been processed.

16. The device according to claim 15, further comprising:
result means for providing the verified speech recognition results to a text application.

17. The device according to claim 16, further comprising:
audio means for providing an currently amended audio file with the verified speech recognition results.

18. The device according to claim 17, wherein the audio means provides the currently amended audio file using a URL pointer to a storage location of the currently amended audio file.

19. The device according to claim 15, wherein a word lattice contains the most likely recognition hypotheses.

20. The device according to claim 15, wherein a recognition sausage contains the most likely recognition hypotheses.

21. The device according to claim 15, wherein the recognition hypotheses are derived via a phone to letter algorithm.

* * * * *